(12) United States Patent  (10) Patent No.: US 7,526,650 B1
Wimmer  (45) Date of Patent: Apr. 28, 2009

(54) PERSONAL IDENTIFIERS FOR PROTECTING VIDEO CONTENT

(75) Inventor: Chris Wimmer, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 10/691,053

(22) Filed: Oct. 22, 2003

(51) Int. Cl.
    *H04L 9/00* (2006.01)
(52) U.S. Cl. ....................................................... 713/176
(58) Field of Classification Search ................. 713/176; 380/203, 23; 2/176
    See application file for complete search history.

(56) References Cited

U.S. PATENT DOCUMENTS

| | | | |
|---|---|---|---|
| 6,314,518 B1 * | 11/2001 | Linnartz | 713/176 |
| 6,411,712 B1 * | 6/2002 | Yoshida et al. | 380/37 |
| 2002/0080964 A1 * | 6/2002 | Stone et al. | 380/255 |
| 2003/0016842 A1 * | 1/2003 | Patton et al. | 382/100 |
| 2003/0037010 A1 * | 2/2003 | Schmelzer | 705/67 |
| 2003/0110516 A1 * | 6/2003 | Chang et al. | 725/136 |
| 2003/0165253 A1 * | 9/2003 | Simpson et al. | 382/100 |
| 2004/0028257 A1 * | 2/2004 | Proehl | 382/100 |

\* cited by examiner

*Primary Examiner*—Kambiz Zand
*Assistant Examiner*—Jason K Gee
(74) *Attorney, Agent, or Firm*—Lee & Hayes, PLLC

(57) ABSTRACT

Subject matter includes personal identifiers for protecting video content. In one implementation an exemplary branding engine receives metadata to assist in determining characteristics of a personal identifier to add to video content as a deterrent against unauthorized redistribution.

30 Claims, 11 Drawing Sheets

PERSONAL IDENTIFIERS FOR PROTECTING VIDEO CONTENT

TECHNICAL FIELD

The subject matter relates generally to multimedia security and more specifically to personal identifiers for protecting video content.

BACKGROUND

Because software tools for downloading and copying video content are now commonplace, it is easy to fall into an unauthorized practice of inadvertently or purposely redistributing proprietary video content. Although various techniques have been implemented or proposed for discouraging unauthorized redistribution of video content, to such as encryption or copy protection schemes, such mechanisms are generally complex and relatively expensive to implement. As described in U.S. Pat. No. 6,574,348 to Venkatesan et al., for example, digital watermarking may use cryptographic techniques to subtly alter video images so that they may later be identified as illicitly copied, even when the watermarking cannot be perceived by the human eye. A watermark typically hides information about the proprietor or copyright holder within the video content itself. When the video content is pirated, the watermark is proof that the content originated with the proprietor. Such digital watermarking schemata, however, are "after-the-fact" measures designed to test whether an image is a duplicate of an original non-marked image. They constitute proof of illicit video content dissemination after the infraction has occurred and typically require enforcement against an end user who redistributed the video content without authorization.

SUMMARY

Subject matter includes personal identifiers for protecting video content. In one implementation an exemplary branding engine receives metadata to assist in determining characteristics of a personal identifier to add to video content as a deterrent against unauthorized redistribution.

DETAILED DESCRIPTION

Overview

Figure 1:
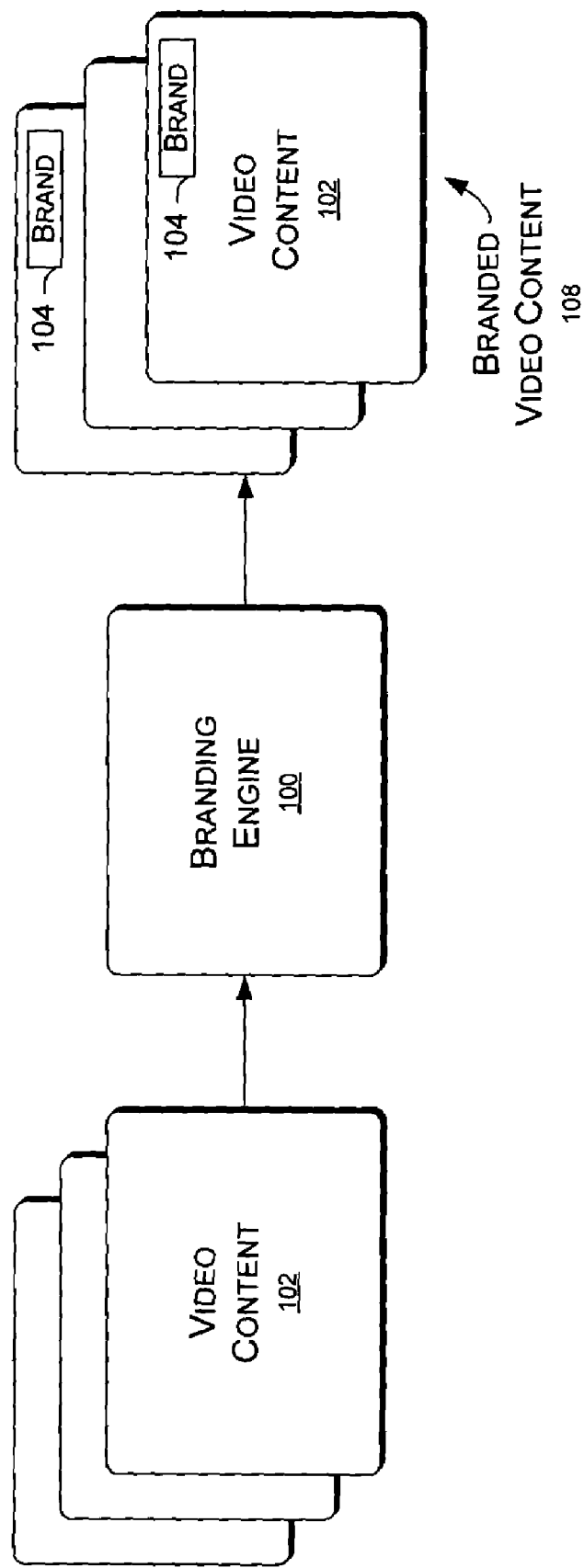
FIG. 1 is a graphic representation of video content branding.

The subject matter presents techniques for branding video content with an end user's personal identity information ("personal identifier," "mark," or "brand") as a deterrent against unauthorized redistribution of the video content by the user. A "user" is a person or personal entity that receives the video content to be protected or the owner of a client device that receives the video content to be protected. This branding of a user's personal identity information—instead of information identifying the video content's original owner or copyright holder—need not be complex or subtle. Indeed, instead of stealthily hiding the brand, a user's brand is purposely placed to be potentially or actually visible and humanly-readable ("legible") when the video content is displayed. The display of the brand acts as an effective psychological deterrent to remind unauthorized redistributors of video content, both inadvertent and willful, that their dissemination of the video content is unauthorized or illegal. The subject matter thus aims to prevent redistribution of content before it happens rather than provide a tool for tracking down a user after an unauthorized redistribution of video content has already been made. However, an exemplary brand could be used for the tracking purposes as well.

The above-mentioned personal identity information constituting a brand consists of one or more pieces of information that positively identify the user entity who received from an owner, broadcaster, provider, etc., video content to be protected from unauthorized redistribution. A "user" may be an individual person or a legal person, such as a corporation. If the user is a corporation, then "personal identity information" means information that identifies the corporation. Whether the user is an individual or a corporation, a personal identifier can include a user's name, address, phone number, email address, Internet Protocol (IP) address, account number, customer number, credit card number, set-top box number, driver's license number, social security number, alien registration number, tax number, etc.

Branded video content "threatens" to reveal the identity of the individual or corporate user redistributing the branded video content to the video content owner or provider, to the world at large, or to both. In one implementation, a user gives personal identity information to a video content provider for the purpose of branding video content under an agreement, such as a contract. Thus, the personal identity information may be submitted in required fields of an agreement. Although the video content provider may have access to a user's personal identity information, for purposes of exemplary branding described herein the personal identity information is stored at the user's end, for example on a client device during installation—e.g., on a set-top box during installation or activation of a cable TV service. This means that the video content provider does not have to custom-brand video content for every user in a video distribution system. Rather, a video content provider can just earmark a video content, such as a program, for branding by using the same indicator, such as a key, a piece of metadata, an attribute in EPG data, etc., for all users. A different brand is then applied at each client device, identifying the user or owner associated with the client device. Once personal identity information is set up at the user's end, a video content provider can brand a program with a personal identifier for each recipient of the program without receiving any information whatsoever from users beforehand.

When a content provider, such as a multi-service operator (MSO), sends analog or digital video content typically including high premium subscription channel content to users, an identifiable mark or logo over the video content might block some of the content. Accordingly, in one implementation of the subject matter an exemplary brand is added to the video content once received at the user's set-top box and unobtrusively located on a border of a National Television System Committee (NTSC) screen format, which is not visible to a TV user when the video content is displayed on many types of television devices. The unobtrusive border can be the area outside the title safe zone. When the "marked" or "branded" video content is copied to a computer and/or Internet system, however, the brand is apparent and legible when the video content is displayed on a computer monitor. In another implementation, a brand is added to the video content when the video content is received at the user's television-enabled software application. In this case, the brand may be apparent each time the video content is displayed. In either case, the brand provides a "fear factor" for users who wish to avoid having their personal identity information branded onto video content to be redistributed to a friend or neighbor, or uploaded into the public domain on the Internet.

In one implementation, metadata, such as electronic program guide (EPG) information sent by a content provider or MSO, informs an exemplary branding engine to distinguish between video programs to brand with personal identifier information and video programs to leave unbranded. Alternatively, metadata may inform an exemplary branding engine to distinguish between channels to brand and channels to leave unbranded. The metadata can also specify a level of security for a program so that a more intense brand can be applied.

In one implementation of the subject matter, an exemplary branding engine progresses from visually subtle personal ID tagging to more visually obvious personal ID tagging based on an end user's record of unauthorized video content redistribution. Alternatively, the exemplary branding engine progresses from subtle tagging to visually obvious tagging based on the sensitivity of the video content to be protected from redistribution.

The described subject matter aims to deter mainstream copying and unauthorized redistribution of video content, not provide a foolproof method of stopping unauthorized redistribution. It is always possible to work around most deterrent measures, and sophisticated editing could crop or overwrite an exemplary brand described herein. Alternatively, a video pirate could obtain a black market set-top box to circumvent an exemplary branding technique. However, such circumvention is cumbersome: black market equipment is not easily procured and removal of a brand might require dubbing over an entire movie. Such circumventing of the branding methods described herein would likely cost more than buying a copy of the video content or a subscription. That methods of deterring mainstream copying of proprietary content can be successful even though the methods themselves are defeatable is shown by recent action of the Recording Industry Association of America. By publicizing an intention to take action against heavy unauthorized downloading of music content, the mere publication of the intent resulted in a 15% reduction in pirated music over a measured period. Since filing lawsuits, unauthorized traffic at a popular music trading website KAZAA has fallen 40% according to Nielsen/Net ratings (March 3-August 3).

In is also worth noting that a potential unauthorized redistributor who knows of an exemplary brand on the video content he is about to pirate, may be additionally deterred by the thought of additional identifiers potentially hidden in the video content. In other words, a potential content pirate might fear that since the video content contains at least one known personal identifier, then like some types of paper money the video content might contain a plethora of anti-counterfeiting measures.

As shown in FIG. 1, an exemplary video content protection engine ("branding engine") 100 receives analog and/or digital video content 102 and adds a legible, human-readable, brand 104 to create branded video content 108. A brand 104 is potentially visible when the video content 102 is displayed or otherwise rendered depending on the location of the brand within a video frame or scan pattern.

The exemplary branding imparted by the subject matter can be used with many types of video content 102, and is particularly relevant for analog video, thereby providing a security solution for an unauthorized redistribution risk known as the "analog hole." Often analog video content can be received in a format that has no built-in security mechanisms and is delivered unencrypted to most users. Thus, unauthorized redistribution of analog video content that has been converted to a digital form is particularly difficult to control. An exemplary branding engine 100 can impart a brand 104 to digitized analog video content, thereby affording video content 102 being received in an analog format the same protection as video content 104 being received in a digital format.

Video Content Branding Systems

Figure 2:
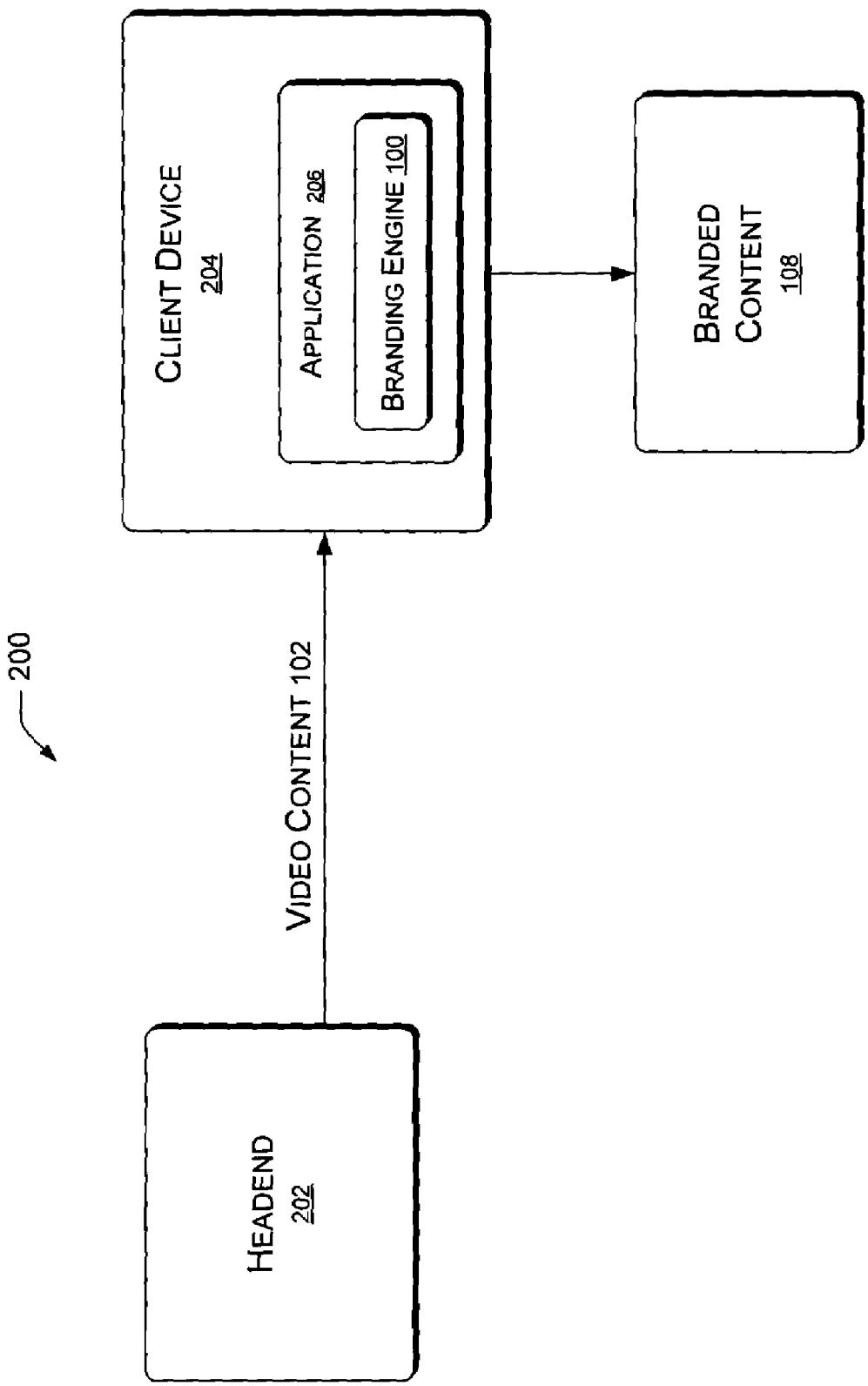
FIG. 2 is a block diagram of an exemplary video content branding system.
Figure 11:
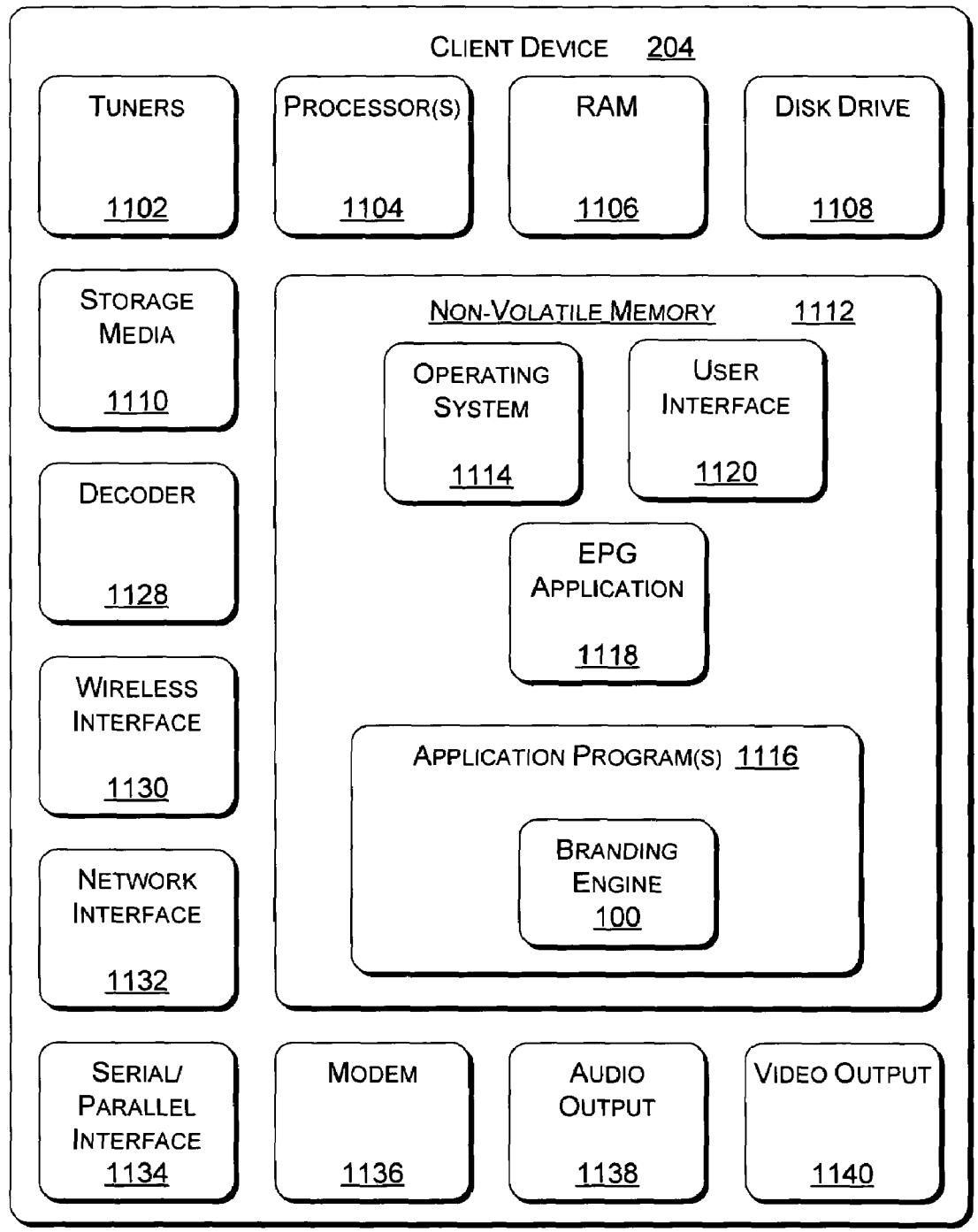
FIG. 11 is a block diagram of an exemplary set-top box device providing an environment suitable for practicing the subject matter.

FIG. 2 shows a video content branding system 200 in which a headend 202 sends video content 102 to a client device 204, such as a user's set-top box for television. The term "client device" 204 refers to an electronic device that receives, stores, or sends video content. Client devices may include televisions, television set-top boxes, personal computers (PCs), personal digital assistants (PDAs), digital versatile disk (DVD) players, personal video recorders (PVRs), and other video-enabled pieces of hardware and/or software, etc. An exemplary client device 204 shown as an example device suitable for practicing the subject matter described herein is illustrated in FIG. 11.

In one implementation, an exemplary branding engine 100 is associated with an application 206 in the client device 204, such as a software application in set-top box middleware. The application 206, including the branding engine 100, brands all or selected video content 102 with a user's personal identity information. The personal identity information may be subtle, such as a personal account number known only to an MSO, or obvious, such as the user's name. Use of private information, of course, may be agreed to by contract before video content is sent to a user.

Figure 3:
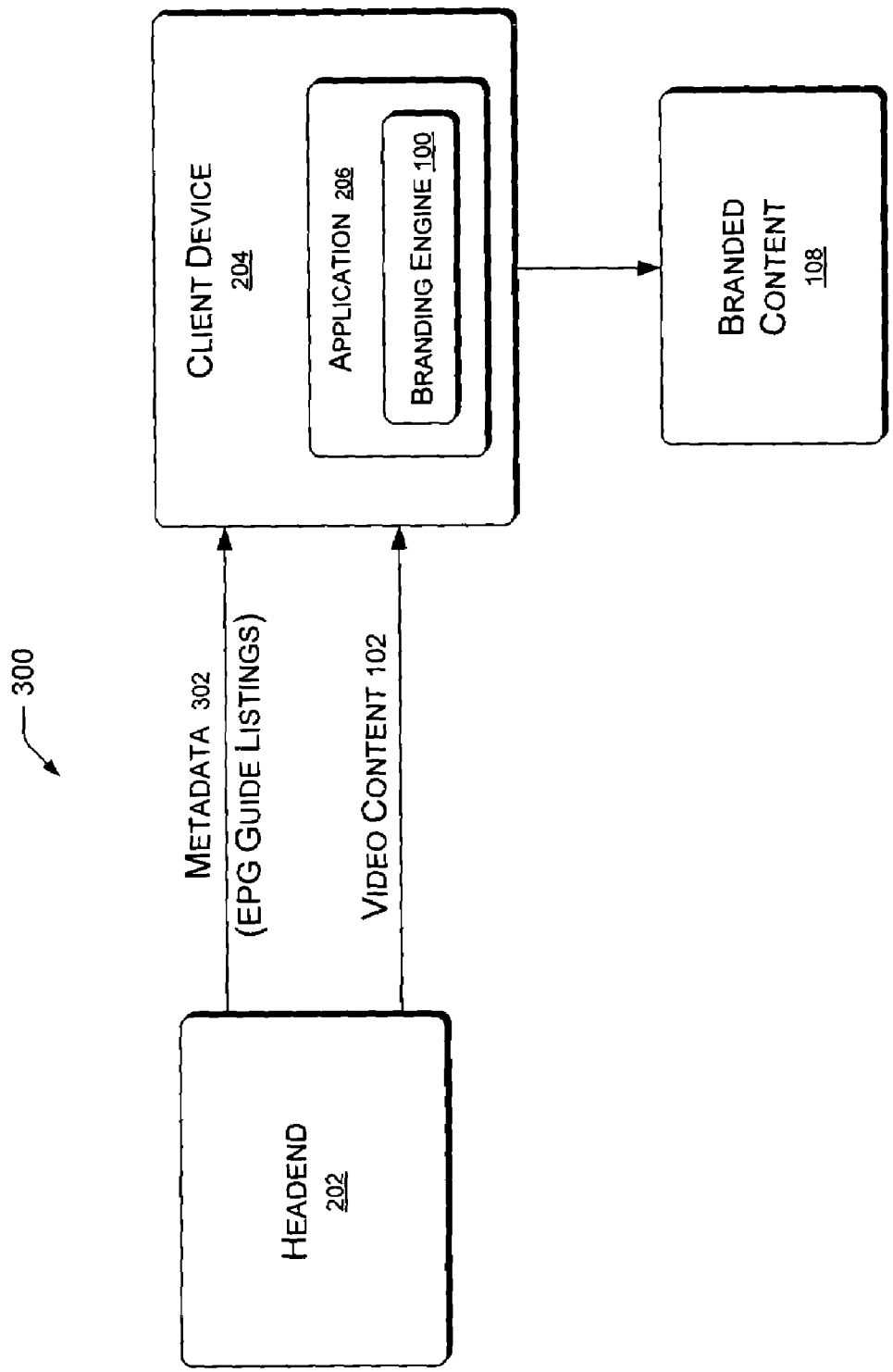
FIG. 3 is a block diagram of another exemplary video content branding system.

FIG. 3 shows another video content branding system 300 in which a headend 202 sends video content 102 and metadata 302 about the video content 102, such as guide listings or other electronic program guide (EPG) information, to a client device 204, such as a user's set-top box or television-enabled computer. An application 206 in the client device 204 includes an exemplary branding engine 100 that uses the metadata 302 to decide which programs or channels associated with the video content 102 to brand. The branding engine 100 may also use the metadata to decide a degree of branding—that is, a branding strength or intensity.

Figure 4:
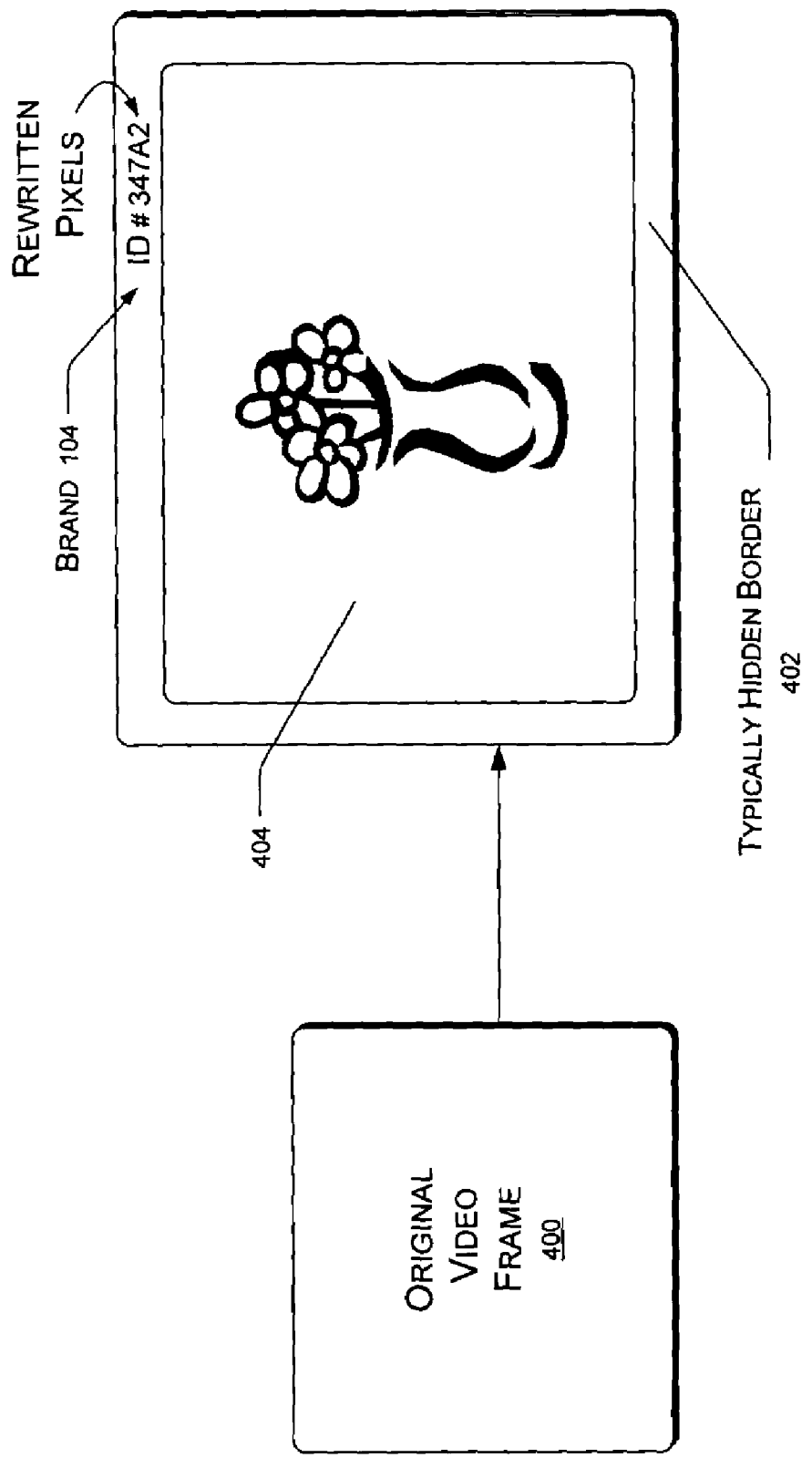
FIG. 4 is a graphic representation of an exemplary brand located on a rendered image of video content.

As shown in FIG. 4, an original video frame or scan pattern 400, after branding, may retain a brand 104 in a typically hidden border 402 of the video frame or scan pattern. On many types of television and video equipment, a user sees only part of the image projected by a cathode ray tube, for instance, in a typically viewable area 404. Video content displayed outside a title safe zone is normally not visible to a user on conventional television equipment. In many cases, the brand 104 can be placed in a location on one or more video frames or within a scan pattern that results in an overlay that is not apparent when the branded video content 108 is rendered on television equipment but becomes visible when the branded video content 108 is readied for unauthorized distribution on personal computer equipment. To recapitulate, if an exemplary brand 104 is placed outside a title safe zone in some television formats it will not show on many types of TVs, but when transferred to a personal computer, the exemplary brand 104 is visible because personal computers generally do not crop or hide the borders of an image.

An exemplary brand 104 may be a set of rewritten pixel values that appear as the user's information, such as an identification (ID) number, set-top box number, name, address, account number, etc., to produce branded video content 108. When viewed in a personal computer and/or Internet context, the brand 104 is typically visible to a human viewer.

In one implementation, an exemplary brand 104 does not need to be placed on every frame or scan of a sequence of video images. For some types of a client devices 204 that have limited resources and/or limited processing power, an exemplary brand 104 may be placed on every "nth" frame or included in every "nth" scan of analog video content. At a display rate of 28 frames per second, perhaps only every $7^{th}$ frame would receive an exemplary brand 104. The exemplary brand 104 would still appear on the displayed video content and provide a deterrent to unauthorized redistribution.

In one implementation, an exemplary branding engine 100 can place an exemplary brand 104 as part of a pre-existing menu bar or overlay mechanism. In other implementations, an exemplary branding engine 100 generates a fresh overlay.

Branding Engine

Figure 5:
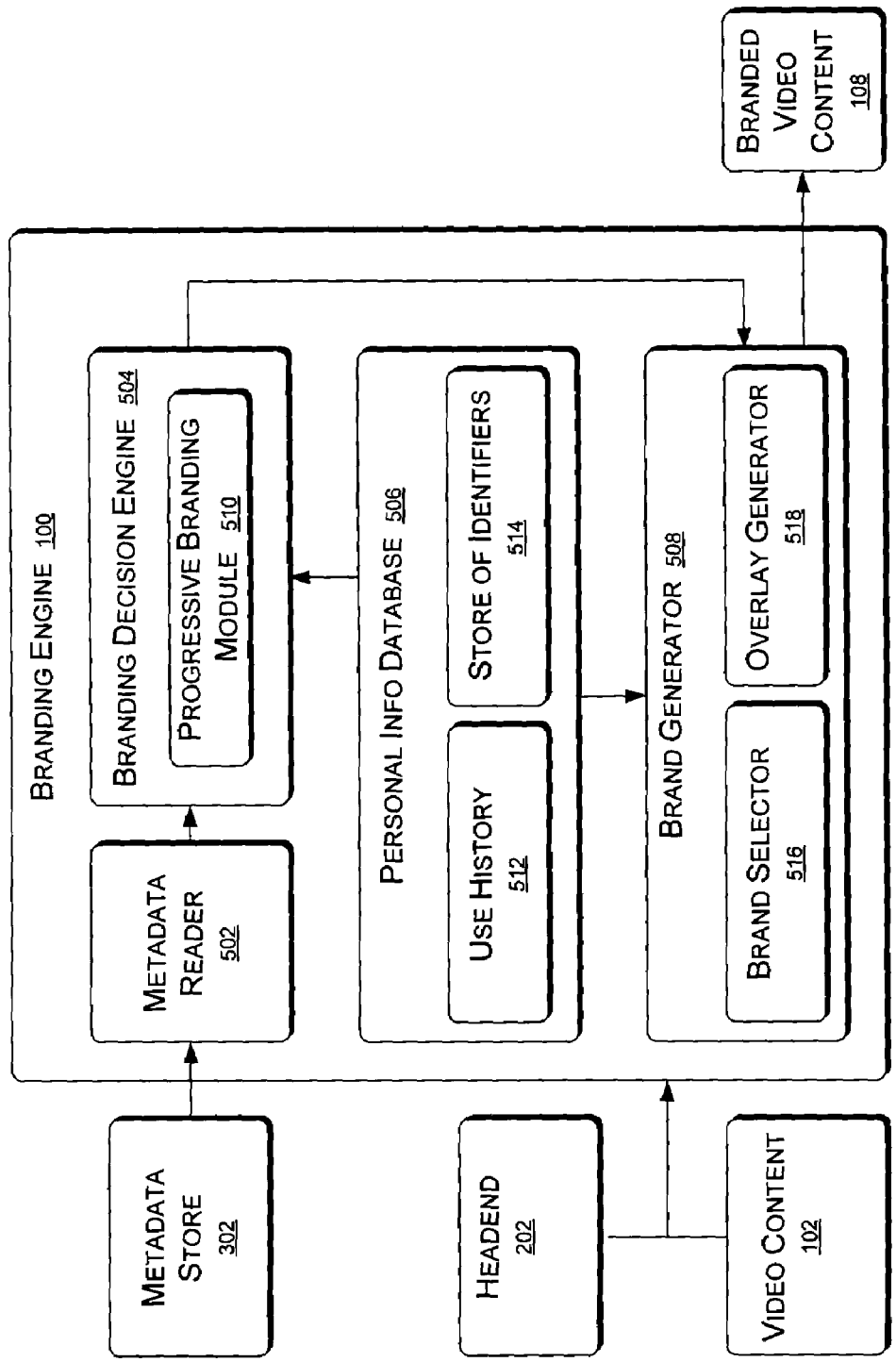
FIG. 5 is a block diagram on an exemplary branding engine.

FIG. 5 shows an exemplary branding engine 100 in greater detail than in previous figures. A metadata reader 502, branding decision engine 504, personal identity information database 506, and brand generator 508 are communicatively coupled as illustrated. The branding decision engine 504 may further include a progressive branding module 510. The personal identity information database 506 may further include a use history 512 and a store of identifiers 514. The brand generator 508 may further include a brand selector 516 and an overlay generator 518. A person having ordinary skill in the video arts will appreciate that an exemplary branding engine 100 may include more, less, or different components than the illustrated branding engine 100, which is presented merely as one example.

A brand generator 508 produces an exemplary brand 104 that may have multiple characteristics. An exemplary brand 104 can be just one piece of personal identity information about a user of the video content, but in some circumstances may be multiple pieces of personal identity information. Thus, the brand generator 508 composes a brand, including the personal identity information to be placed in the brand, the number of locations within a video content frame to place the brand 104 (a brand 104 could be repeated in multiple places within a video frame or a single brand 104 could consist of different pieces of personal identity information, each placed in a different location within a video frame), the size and color characteristics of the brand, etc.

In one implementation, a metadata reader 502 receives metadata 302, e.g., directly from a headend 202 or from a local metadata store. Many client devices 204 receive video content in a stream, but receive EPG metadata 302 in a packet that may provide program listings for several weeks of programming at a time, that is, the client device 204 may store several weeks' worth of EPG metadata locally. The metadata reader 502 sends the decoded or currently relevant metadata to the branding decision engine 504. In one implementation, the metadata reader 502 also interprets the metadata 302, but in another implementation the branding decision engine 504 interprets the metadata 302. The metadata 302 may contain instructions for branding video content 102. Certain programs or channels may be marked for branding, e.g., with the same kind of marking that is used for other EPG attributes such as "stereo," "rating," "pay-per-view," "dolby," etc. This type of metadata 302 may indicate in a "yes-or-no" fashion whether the branding decision engine 504 should proceed with branding a given video content 102.

If metadata 302 relevant to the video content 102 being received exists, then the metadata 302 may also sometimes provides security information to the branding decision engine 504 to be used by a progressive branding module 510 associated with the branding decision engine 504, as discussed below.

The branding decision engine 504 receives the metadata 302 or interpretation from the metadata reader 502 and may be employed to decide which parts or programs within a video content 102 are to receive a brand 104. When the branding decision engine 504 decides to brand a video content 102 or program, an indication is sent to the brand generator 508 to brand the associated video content 102.

A progressive branding module 510 associated with the branding decision engine 504 may use security information received via metadata 302 to decide a security level for the brand 104 to be applied and accordingly, the degree or intensity of branding to use. Sensitive video content 102 (e.g., as designated by an MSO) can receive a stronger brand 104 than unimportant video content 102. Public domain content may not receive any brand 104 at all. The decision, including a security level and/or an intensity of branding to use is sent to the brand generator 508.

The branding decision engine 504 can also receive input from a personal identity information database 506, which includes personal identity information of or about the user. Some of the personal identity information may be identifiers, such as name, phone number, set-top box number, etc., kept in a store of identifiers 514. The progressive branding module 510 can also use other personal identity information from a "use history" 512, which is a record of a user's history of unauthorized video redistribution, if any. The use history 512 can be used like a "credit report" to assist the progressive branding module 510 to decide the intensity of the branding to apply, in the same way that security level information from the metadata 302 assisted the progressive branding module 510 to decide branding intensity. If the user has a clean history, i.e., a high credit score, then only low intensity branding may be needed. But if the user has a low credit score from several incidents of unauthorized action, then the branding decision engine may inform the brand generator 508 to apply higher intensity branding.

The brand generator 508 receives or has access to video content 102 for potential branding, wherein the video content 102 may be received directly from a headend 202 or may be received from a local store of video content 102. The brand generator 508 also receives decisions about whether or not to brand a program and the associated branding intensity to use from the branding decision engine 504, as described above. Thus, a brand selector 516 associated with the brand generator 508 can determine characteristics of the brand 104 based on the decision and security level information received.

The brand selector 516 selects a format for the brand 104 or builds a brand 104 that may have characteristics, such as an amount of personal identity information about the user to use as a brand 104, the actual personal identity information about the user to use in or as the brand 104, a visual size of the brand 104 relative to a display size of the video content 102, and a display location or locations for the brand 104 within a displayed image of the video content 102.

An exemplary brand generator 508 may also include an overlay generator 518 to place or embed the brand 104 "in," "on," "over," or "with" the video content 102. These various terms are used to indicate a brand 104 being added to video content 102. In other words, no matter what form the video content 102 is in when it is output as branded video content 108 from a client device 204, e.g., a set-top box, the brand 104 is combined "in" or "with" the video content 102 so that when the branded video content 108 is displayed on equipment, the brand 104 is visually located "in," "on," or "over" the displayed video content (even though the visibility of the brand 104 may be obscured by the TV set cabinet, for instance).

In one implementation, the exemplary overlay generator 508 creates a title bar menu overlying rendered video content images on which the brand information can be displayed. Alternatively, the overlay generator 508 rewrites pixels of the video content 102 without reference to creating a menu on which to post the brand 104.

In some implementations, if the rendered video content 102 is a sequence of frames or scans, the brand 104 may only need to be placed on every "nth" frame to be visible for deterring the user from redistributing the video content 102. For example, if a video sequence plays at 28 frames per second, then displaying the brand every 7th frame may be sufficient to provide a humanly visible brand.

Figure 6:
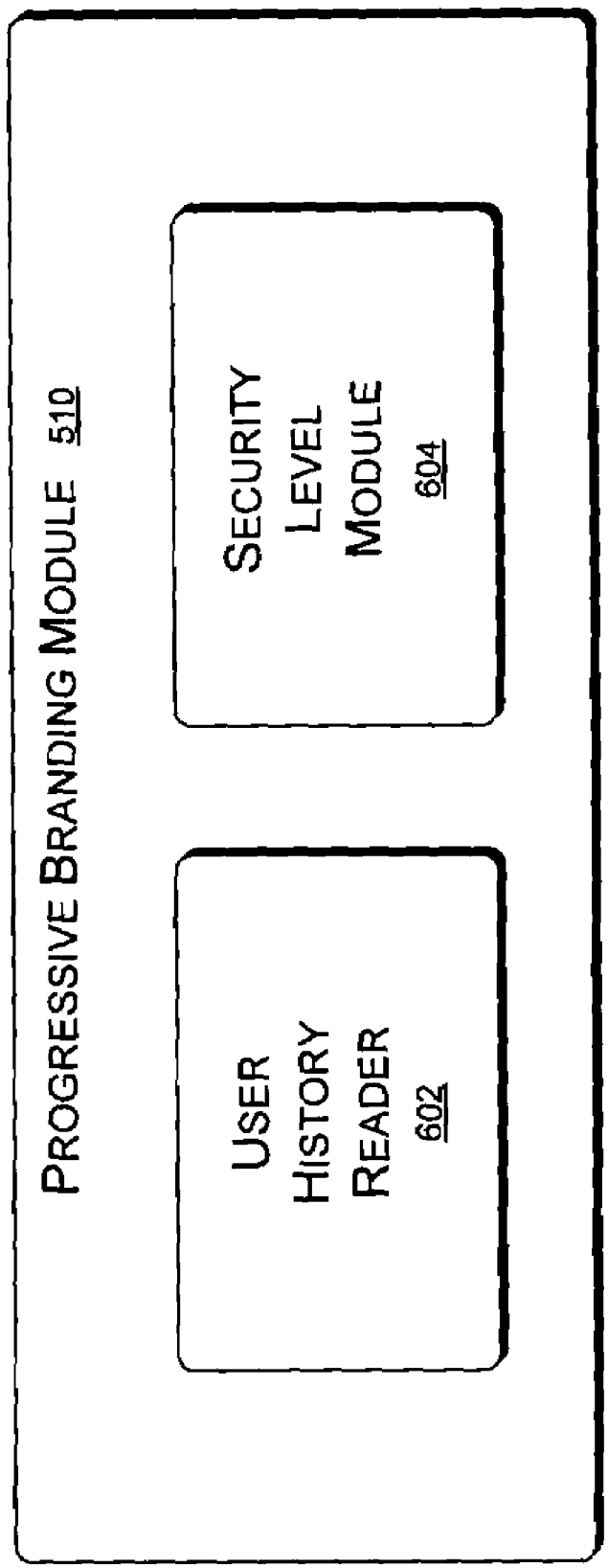
FIG. 6 is a block diagram of an exemplary progressive branding module 520.

FIG. 6 shows the exemplary progressive branding module 510 of FIG. 5 in greater detail. Since the progressive branding module 510 may receive information for deciding a branding intensity from one or both of the metadata 302 and the use history 512, the progressive branding module 510 may include a use history reader 602 and a security level module 604 to interpret security information from the metadata 302 and/or the use history 512.

Figure 7:
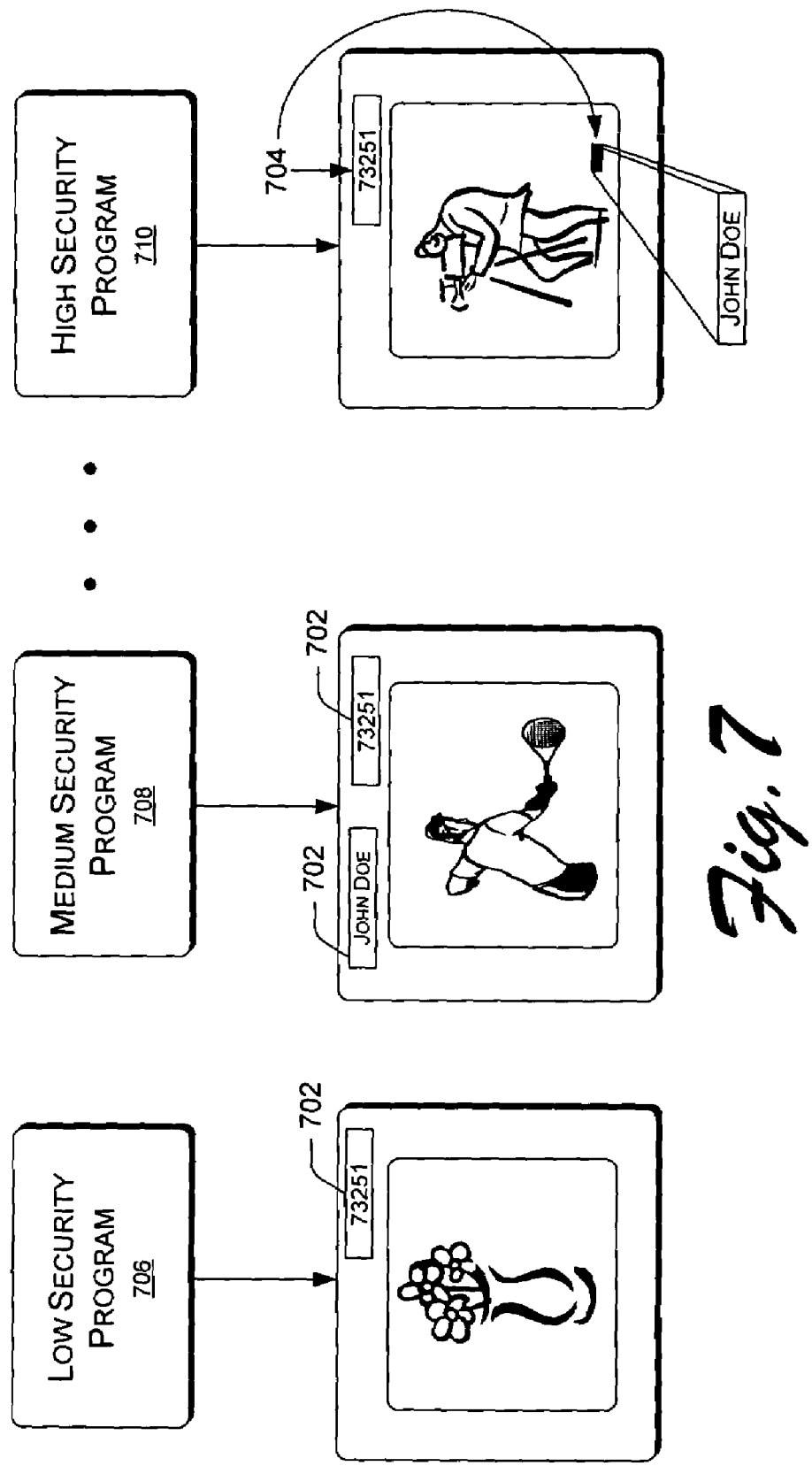
FIG. 7 is a graphic representation of scaling various brands to various program security levels.

FIG. 7 shows various brands 104, 702, 704 placed on video content 102 according to a security level. A predetermined security level as such may be assigned to the video content 102 (or programs within the video content 102) by certain types of EPG metadata 302 or, a security level may be derived from the metadata 302 by an exemplary branding engine 100. In a variation, the security level module 604 may determine the security level of a program based on security cues in the video content 102 itself (not using the metadata 302) or based on the manner of the reception of the video content 102. For example, the security level module 604 may read the video content 102 and assign a security level of "two" out of four to all programming that is received as a "live" broadcast. Or again, a security level module 604 may be programmed to assign a security level of "two" to those programs whose EPG metadata 302 indicate they are movies. In some implementations, an extra layer of metadata 302 may be used, i.e., included in EPG information received from a headend 202, that indicates each particular program to be branded, and in some implementations, the security level to be assigned to each.

Whatever technique is used to animate an exemplary security level module 604, the security level module 604 or other parts of a branding engine 100 may assign different brands 104 to different programs or video contents 102. For example, a low security program 706 may be branded with a standard (e.g., relatively low security) brand 104 that consists of a number that only indirectly identifies a user, displayed in an area of rendered video content that is usually not visible on a television set. A medium security program 708 may be branded with a relatively medium security brand 702, for example, a multipart brand 702 having a relatively obscure ID number part that only indirectly identifies the user, and a user's name part, both placed in a border of the rendered video content that in usually not visible on a television set. A high security program 710 may be branded with a relatively high security brand 704, for example, a multipart brand 704 including a relatively large ID number part placed in a border of the rendered video content that in usually not visible on a television set and a user's name part, this time placed in a viewable, but normally unobtrusive area of the rendered video content.

Figure 8:
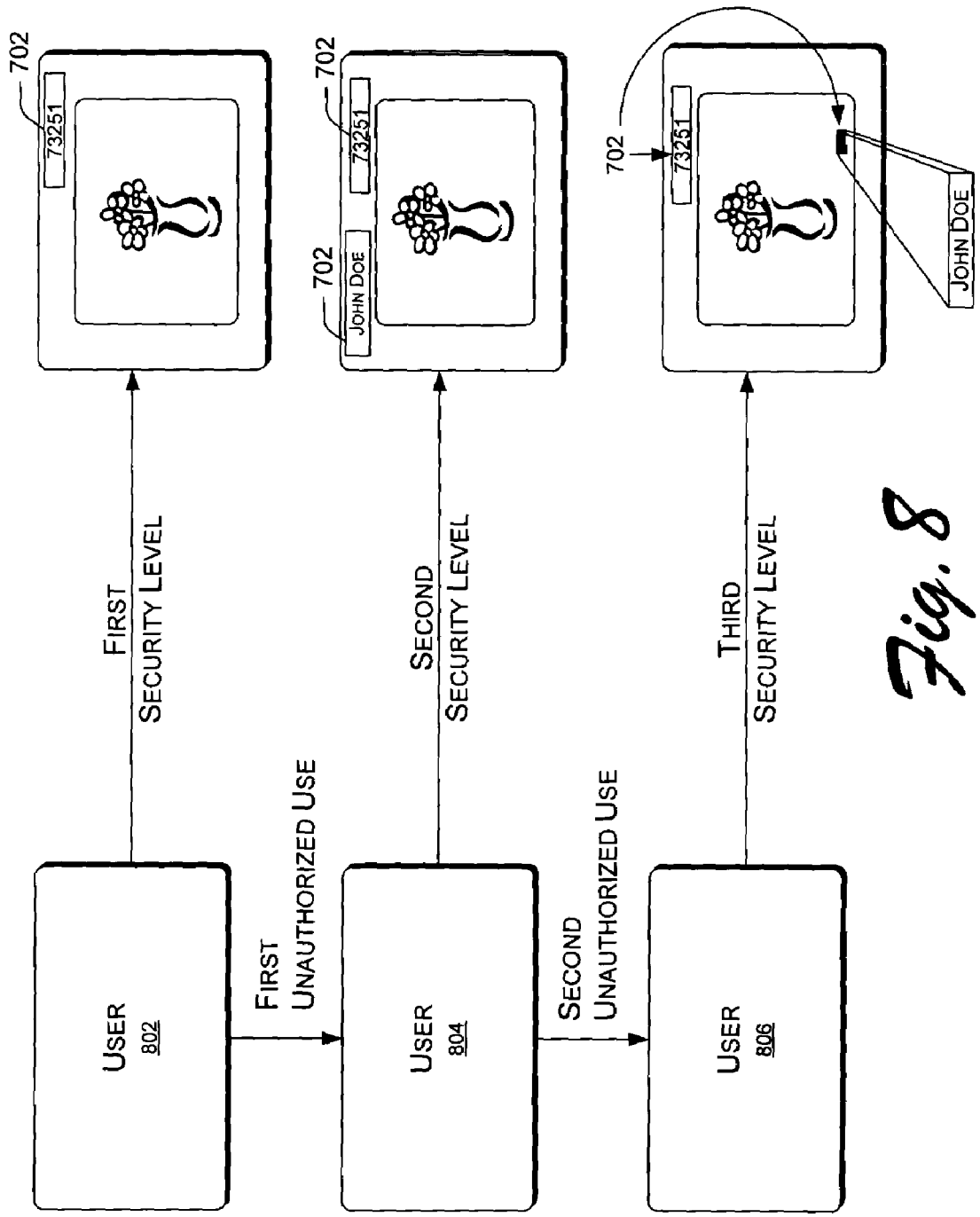
FIG. 8 is a graphic representation of scaling various brands to a user's history of unauthorized dissemination of video content.

FIG. 8 shows security levels assigned to video content 102 on the basis of a user's history of unauthorized dissemination of video content. Accordingly, in one implementation a user history reader 602 in the progressive branding module 510 may read a use history 512, for example, in a personal identity information database 506 of a branding engine 100. A user 802 with a use history 512 indicating no unauthorized uses may be assigned a type of brand 104 that is relatively innocuous, such as an indirect ID number hidden on a border of the rendered video content.

A first-time offending user 804 may have a use history 512 that triggers a progressively larger, more obvious, and/or multipart brand 702. Likewise, a second-time offending user 806 may be assigned an even larger, more obvious, and/or more "personal" brand 704 that more directly identifies the user. Hence, an exemplary progressive branding module 510 may increase deterrent characteristics of brands, such as their size, brightness, position within an image, and degree of exposure of private personal identity information as the security of the video content and/or the use history 512 of a particular user warrants.

Exemplary Methods

Figure 9:
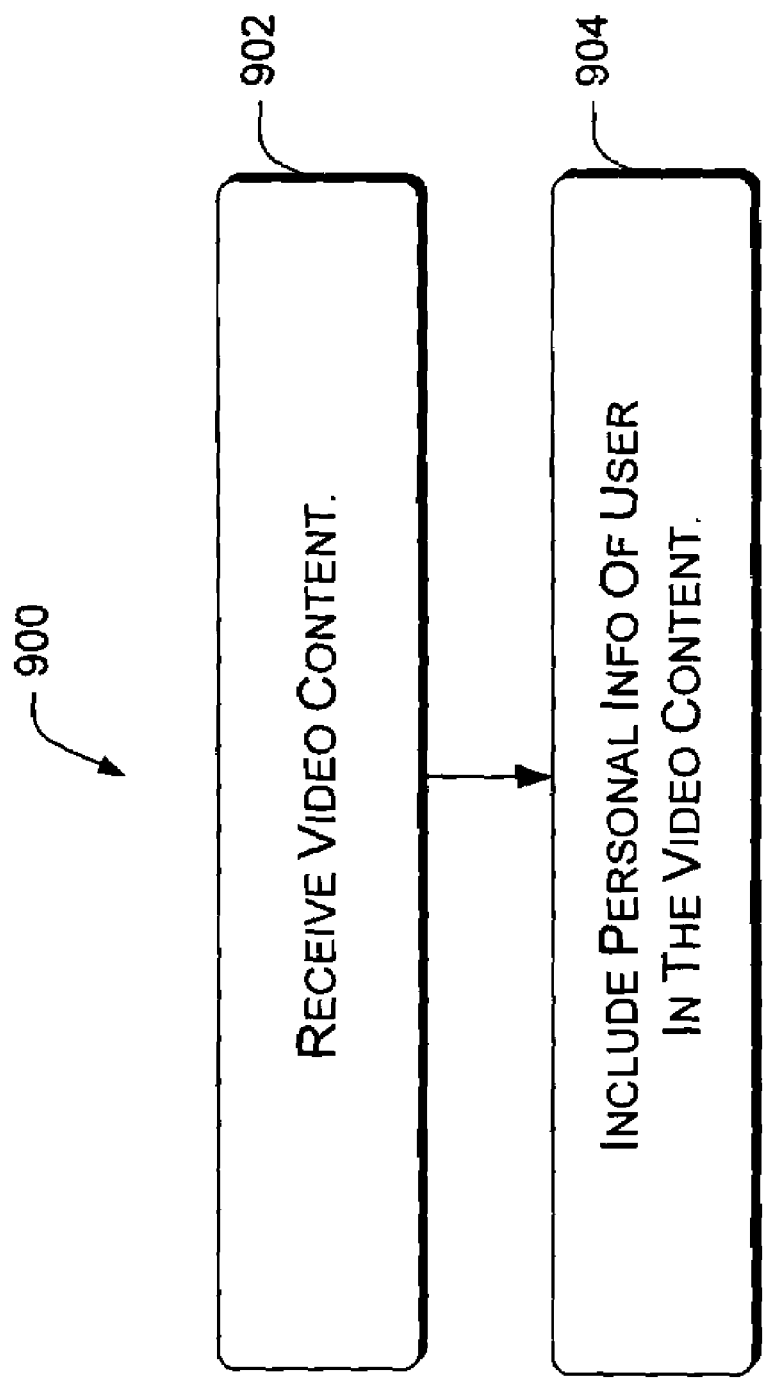
FIG. 9 is a flow diagram of an exemplary method of branding video content to deter unauthorized dissemination.

FIG. 9 shows an exemplary method 900 of branding video content to deter unauthorized redistribution of the video content. In the flow diagram, the operations are summarized in individual blocks. The operations of the exemplary method 900 may be performed in hardware and/or as machine-readable instructions (software or firmware) that can be executed by a processor or a device, such as a device that includes an exemplary branding engine 100.

At block 902, video content 102 is received. The video content 102 may contain individual programs and/or channels containing individual programs. The video content 102 may be analog or digital and may be displayable as a scan pattern on television equipment, or as one or more video frames or images on digital video display equipment.

At block 904, personal identity information of a user is included in the video content 102 for potentially visible display when the video content 102 is displayed.

Figure 10:
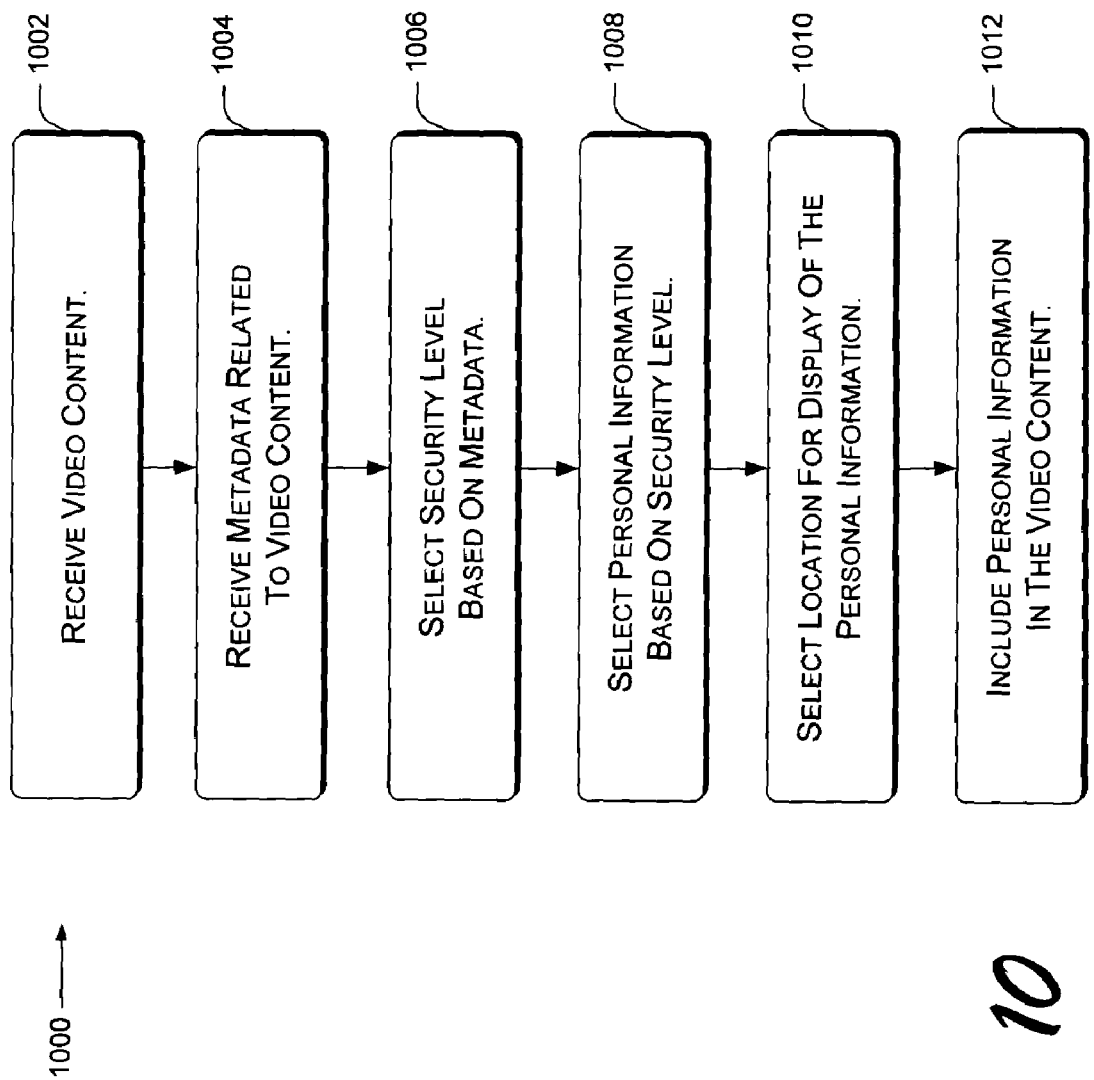
FIG. 10 is a flow diagram of another exemplary method of branding video content to deter unauthorized dissemination.

FIG. 10 shows another exemplary method 1000 of branding video content 102 to deter unauthorized redistribution of the video content 102. In the flow diagram, the operations are summarized in individual blocks. The operations of the exemplary method 1000 may be performed in hardware and/or as machine-readable instructions (software or firmware) that can be executed by a processor or a device, such as a device that has an exemplary branding engine 100.

At block 1002, video content 102 is received.

At block 1004, metadata 302 related to the video content 102 is received.

At block 1006, a security level is selected based on the metadata 302.

At block 1008, personal identity information of a user is selected based on the security level selected.

At block 1010, a location for display of the personal identity information within images of the video content 102 is selected.

At block 1012, the personal identity information is included in the video content for display when the video content 102 is displayed or, from a different point of view, the personal identity information is output as a video signal with the video signal representing the original video content 102.

Exemplary Environment

FIG. 11 shows an exemplary client device 204 providing an example environment in which the subject matter, such as the branding engine 100 and exemplary methods (e.g., 900, 1000) may be practiced. A client device 204 may be a set-top box for receiving cable, satellite, PVR, over-the-air, and/or hard disk video content 102; a television that has an ability to host an exemplary branding engine 100; a television-enabled hardware or software component; a television-enabled computing device, etc. A client device 204 typically includes tuners 1102, which are representative of one or more in-band tuners that tune to various frequencies or channels to receive television broadcast signals, as well as additional tuner(s) that may be configured to tune to a broadcast channel corresponding to an out of band network. Alternatively, tuners 1102 may represent a single tuner that is configured to simultaneously receive multiple data streams (including both program content and broadcast data) over a single channel.

A client device 204 may also include one or more processors 1104 that process various instructions to control the operation of the client device 204 and to communicate with other electronic and computing devices. A client device 204 can be implemented with one or more memory components, examples of which include a random access memory (RAM) 1106, a disk drive 1108, a mass storage component 1110, and a non-volatile memory 1112 (e.g., ROM, Flash, EPROM, EEPROM, etc.). The memory components (e.g., RAM 1106, disk drive 1108, storage media 1110, and non-volatile memory 1112) store various information and/or data such as received content, EPG data, configuration information for the client device 204, and/or graphical user interface information. A non-volatile memory 1112 component may also be configured to maintain an identifier associated with the last selected configuration definition so that the same configuration can be selected if the client device 204 is powered off and back on again.

Alternative implementations of a client device 204 can include a range of processing and memory capabilities, and may include more or fewer types of memory components than those illustrated in FIG. 11. For example, full-resource clients may be implemented with substantial memory and processing resources, including a disk drive 1108 to store content for replay by the viewer. Low-resource clients, however, may have limited processing and memory capabilities, such as a limited amount of RAM 1106, no disk drive 1108, and limited processing capabilities of the processor 1104.

An operating system 1114 and one or more application programs 1116, including software components of a branding engine 100, for example, may be stored in non-volatile memory 1112 and executed on processor 1104 to provide a runtime service and/or environment. A runtime environment facilitates extensibility of a client device 204 by allowing various interfaces to be defined that, in turn, allow application programs 1116 to interact with the client device 204. Alternatively, a branding engine 100 may also be implemented as one or more hardware components or as part of an operating system 1114.

In the illustrated example client device 204, an EPG application 1118 may also be stored in non-volatile memory 1112 to operate on received EPG data and generate a program guide. The application programs 1116 that may be implemented on client device 204 can include a browser to browse the Web (e.g., "World Wide Web"), an email program to facilitate electronic mail, and so on. A user interface component 1120 may also be stored in non-volatile memory 1112 and executed on a processor 1104 to provide user interaction with the client device 204.

A client device 204 may also be implemented to include other components pertaining to a television entertainment system which are not illustrated in this example. For instance, a client device 204 can include user interface lights, buttons, controls, and the like to facilitate additional viewer interaction with the client device 204.

The illustrated client device 204 also includes a decoder 1128 to decode a broadcast video signal, such as an NTSC, PAL, SECAM or other TV system video signal. A client device 204 may also include such combinations of interfaces as a wireless interface 1130, a network interface 1132, a serial and/or parallel interface 1134, and a modem 1136, etc. A wireless interface 1130 allows a client device 204 to receive input commands and other information from a user-operated input device, such as from a remote control device or from another IR, Bluetooth, or similar RF input device.

Network interface 1132 and serial and/or parallel interface 1134 allow a client device 204 to interact and communicate with other electronic and computing devices via various communication links. Although not shown, a client device 204 may also include other types of data communication interfaces to communicate with other devices. The modem 1136 facilitates communication between the client device 204 and other electronic and computing devices via a conventional telephone line.

A client device 204 may also include an audio output 1138 and a video output 1140 that provide signals, such as an overlay that includes an exemplary brand, to a television or other device that can process, present, or otherwise render audio and video content. Some of the components of the illustrated client device 204 may be implemented in an application specific integrated circuit (ASIC). Additionally, a system bus (not shown) typically connects the various components within a client device 204. A system bus can be implemented as one or more of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

CONCLUSION

The foregoing describes exemplary personal identifiers for protecting video content and systems and methods to brand the video content with the personal identifiers. The subject matter described above can be implemented in hardware, in software, or in both hardware and software. In certain implementations, an exemplary branding engine and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method having computer instructions executable by a processor, comprising:
    receiving, on a user device, a video content to be branded with personal information of a user to deter the user from unauthorized redistribution of the video content, wherein the video content is digital or analog;
    receiving, on the user device, metadata about the video content, wherein the metadata contains instructions about which programs of the video content to brand and a branding strength for the video content;
    interpreting the metadata received to determine whether to brand the video content by adding a personal identifier based on corresponding instructions contained within the metadata;
    selecting a security level of the video content to be branded based on sensitivity of the video content as received via interpreted metadata;
    branding the video content to be branded by adding the personal identifier, stored on the user device, to the video content, wherein the personal identifier is different for each user device and each user and the personal identifier does not have to be sent to a provider of the video content;
    retaining the personal identifier on a hidden border of a frame on a television monitor; and
    displaying the personal identifier when the video content is transferred to a computing device, wherein the personal identifier displays information associated with the user of the video content, wherein the personal identifier is placed on at least one of a fixed number of frames or a fixed number of scan patterns for analog video content, and wherein the personal identifier distinguishes channels to brand and channels to leave unbranded, branded channels having a level of security for a program.

2. The method as recited in claim 1, wherein the video content includes multiple programs.

3. The method as recited in claim 2, further comprising receiving metadata to distinguish between at least one of the multiple programs to receive the personal identifier and some of the multiple programs to remain without a personal identifier.

4. The method as recited in claim 3, wherein the metadata is electronic program guide information.

5. A method having computer instructions executable by a processor, comprising:
    receiving video content on a first client device;
    receiving, on the first client device, metadata about the video content, wherein the metadata contains instructions about which programs of the video content to brand and a branding strength for the video content;
    interpreting the metadata received to determine whether to brand the video content by adding a personal identifier based on corresponding instructions contained within the metadata;
    adding the personal identifier to the video content, wherein an amount of the personal identifier that is added to the video content is based on a security level of a program;
    retaining the personal identifier on a hidden border of a frame on the first client device; and
    displaying the personal identifier when the video content is replayed on a second client device, wherein the personal identifier signifies personal identity information of an owner of the first client device, wherein the personal identifier is placed on at least one of a fixed number of frames or a fixed number of scan patterns for analog video content, and wherein the personal identifier distinguishes channels to brand and channels to leave unbranded, branded channels having a level of security for a program.

6. The method as recited in claim 5, further comprising including the personal identifier in the video content when the second client device outputs the video content.

7. The method as recited in claim 6, wherein the second client device outputs the video content by displaying the video content.

8. The method as recited in claim 5, wherein the second client device is one of a personal computer, a personal digital assistant, a digital versatile disk player, or a personal video recorder.

9. The method as recited in claim 5, wherein the video content includes multiple programs.

10. The method as recited in claim 9, further comprising receiving metadata about the multiple programs.

11. The method as recited in claim 10, wherein the metadata includes a security level for at least some of the multiple programs.

12. The method as recited in claim 11, wherein a displayed size of the personal identity information added to the program is based on the security level of the program.

13. The method as recited in claim 11, wherein a visibility of a location of the personal identity information within a displayed image of the program is based on the security level of the program.

14. The method as recited in claim 11, wherein the metadata includes a record of the user's history of unauthorized redistribution of a video content.

15. The method as recited in claim 14, wherein variance in a display factor is based on the record, wherein display factors include an amount of the personal identity information added to a program, a display size of the personal identity information added to the program, and a visibility of a location of the personal identity information added to the program.

16. A branding engine for video content, comprising:
    a brand generator, on a user device, to produce a brand, wherein the brand includes at least one piece of personal identity information stored on the user device, about a user of the video content and is different for each user device and each user;
    a branding decision engine, wherein if the video content comprises frames, then to decide which frames of the video content are to receive the brand;
    a branding selector configured to determine what characteristics will comprise the brand, wherein the branding selector decides on at least an amount of personal identity information, a visual size of the brand, and a display location of the brand;
    a branding decision engine configured to interpret metadata corresponding to the video content to determine which video content to brand based on metadata of the video content;

a security level module configured to interpret security information from the metadata to determine a security level of the video content corresponding to the metadata;

the branding decision engine further configured to send an indication to the brand generator to brand the video content when the branding decision engine determines to brand the video content; and an overlay generator configured to place the brand in the video content on a hidden border of the frames wherein the brand is displayed outside a title safe zone on a television monitor;

wherein the brand is placed on at least one of a fixed number of frames or a fixed number of scanned analog video content;

wherein the branding decision engine distinguishes channels to receive the brand and channels to leave unbranded, branded channels having a level of security for a program;

the branding decision engine further configured to determine which channels to brand based on the metadata information; and the branding decision engine further configured to employ interpreted metadata corresponding to the video content to determine a branding strength for the video content based on the level of security for the program.

17. The branding engine as recited in claim 16, further comprising a metadata reader to read metadata about the video content, wherein if metadata relevant to the video content exist, then the metadata provide security information to the branding decision engine.

18. The branding engine as recited in claim 17, wherein the security information indicates which programs within the video content to brand.

19. The branding engine as recited in claim 17, wherein the security information includes a security level for a program within the video content, wherein the security level determines characteristics of the brand to be added to the program.

20. The branding engine as recited in claim 16, further comprising a brand selector associated with the brand generator, wherein the brand selector determines one of: a piece of personal identity information about the user of the video content to use as a brand, an amount of personal identity information about the user to use as a brand, a visual size of the brand relative to a display size of the video content, and a display location for the brand within a displayed image of the video content.

21. The branding engine as recited in claim 16, further comprising a database of personal identity information about the user communicatively coupled with the branding decision engine.

22. The branding engine as recited in claim 21, further comprising a store of identifiers associated with the database of personal identity information.

23. The branding engine as recited in claim 22, further comprising a record of the user's history of unauthorized redistribution of a video content associated with the database of personal identity information.

24. The branding engine as recited in claim 23, further comprising a progressive branding module associated with the branding decision engine, wherein the progressive branding module determines a security level for a branding decision based on the record of the user's history.

25. The branding engine as recited in claim 23, further comprising a progressive branding module associated with the branding decision engine, wherein the progressive branding module determines a security level for a branding decision based on a metadata.

26. The branding engine as recited in claim 25, wherein the brand selector uses a security level determined by the progressive branding module to determine one of a piece of personal identity information about the user of the video content to use as at least part of a brand, an amount of personal identity information about the user to use as at least part of a brand, a size of the brand, and a display location for the brand within a displayed image of the video content.

27. One or more computer readable storage media containing instructions that are executable by a computer to perform actions comprising:

receiving a personal identifier of a video content user, wherein the personal identifier contains information associated with the video content user;

receiving metadata in a packet about the video content user and about a video content received by the video content user;

interpreting the metadata received to determine whether to brand the video content received by the video content user, wherein branding comprises adding the personal identifier to the video content based on corresponding instructions contained within the metadata;

selecting a security level of the video content to be branded based on sensitivity of the video content as received via interpreted metadata;

determining which channels of the video content to brand based on instructions in the metadata associated with the video content;

determining a branding strength for the video content based on information in the metadata;

branding the video content determined to be branded by adding the personal identifier to the video content received by the video content user;

retaining the personal identifier on a hidden border of a frame; and displaying the personal identifier when the video content is replayed on a client device, wherein the personal identifier is placed on at least one of a fixed number of frames or a fixed number of scan patterns for analog video content, and wherein the personal identifier distinguishes channels to brand and channels to leave unbranded, branded channels having the security level for a program of the video content.

28. The one or more computer readable media as recited in claim 27, wherein the adding the personal identifier to the video content comprises an image of the personal identifier displaying in response to the video content displaying.

29. The one or more computer readable media as recited in claim 27, further comprising outputting the personal identifier as a video signal when the video content is output as a video signal.

30. The one or more computer readable media as recited in claim 27, wherein the adding further comprises adding the personal identifier as a video signal to the video content and outputting the video content and the personal identifier.

* * * * *